(12) United States Patent
Cummings

(10) Patent No.: US 10,845,618 B2
(45) Date of Patent: Nov. 24, 2020

(54) TEMPLE ATTACHMENT FOR EYEWEAR

(71) Applicant: MaryBelle Cummings, Zanesville, OH (US)

(72) Inventor: MaryBelle Cummings, Zanesville, OH (US)

( * ) Notice: Subject to any disclaimer, the term of this patent is extended or adjusted under 35 U.S.C. 154(b) by 123 days.

(21) Appl. No.: 16/196,259

(22) Filed: Nov. 20, 2018

(65) Prior Publication Data

US 2020/0183184 A1 Jun. 11, 2020

(51) Int. Cl.
*G02C 5/14* (2006.01)

(52) U.S. Cl.
CPC .................... *G02C 5/146* (2013.01)

(58) Field of Classification Search
CPC .................. G02C 5/18; G02C 5/146
See application file for complete search history.

(56) References Cited

U.S. PATENT DOCUMENTS

| | | | | |
|---|---|---|---|---|
| 2,502,734 A | * | 4/1950 | Lyons ................. | G02C 5/143 351/122 |
| 4,958,923 A | * | 9/1990 | Rosenson ............. | G02C 5/00 351/106 |
| 2011/0075093 A1 | * | 3/2011 | Hobbs ................ | G02C 7/105 351/45 |
| 2011/0317402 A1 | * | 12/2011 | Cristoforo ........... | A42B 3/044 362/106 |

\* cited by examiner

*Primary Examiner* — Wen Huang
(74) *Attorney, Agent, or Firm* — The Iwashko Law Firm, PLLC; Lev Ivan Gabriel Iwashko

(57) ABSTRACT

A temple attachment for a pair of glasses, including a main body of a predetermined size to fit at least one temple on the pair of glasses, such that the main body varies in at least one of shape, color, style, scent, texture, and durability, and a groove extending across a length of the main body to receive at least a portion of the at least one temple therein to affix the main body on the at least one temple.

5 Claims, 3 Drawing Sheets

TEMPLE ATTACHMENT FOR EYEWEAR

BACKGROUND

1. Field

The present general inventive concept relates generally to an attachment, and particularly, to a temple attachment for eyewear.

2. Description of the Related Art

Eyewear is a popular compliment to people's outfits. Unfortunately, eyewear frames tend to be limited in shape and design.

Matching eyewear to clothing is fine, but it may be difficult to coordinate them with accessories or outfits, at times. With today's ever-changing fashion trends, individuals often have multiples of a single item with each of the items being different in shape and/or appearance, which can lead to ever-increasing costs for individuals chasing changing fads and trends.

Therefore, there is a need for a customizable attachment for eyewear.

SUMMARY

The present general inventive concept provides a temple attachment for eyewear.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a temple attachment for a pair of glasses, including a main body of a predetermined size to fit at least one temple on the pair of glasses, such that the main body varies in at least one of shape, color, style, scent, texture, and durability, and a groove extending across a length of the main body to receive at least a portion of the at least one temple therein to affix the main body on the at least one temple.

The main body may snap onto the at least one temple via the groove.

The main body may slide onto the at least one temple via the groove.

The main body may wrap around the at least one temple and is molded to fit the at least one temple via the groove.

The temple attachment may further include a hinge to extend across the length of the main body, a first side of the main body connected to the hinge, and a second side of the main body connected to the hinge to pivot along the hinge to open or close.

The temple attachment of claim 4, wherein the first side and the second side encase the at least one temple.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
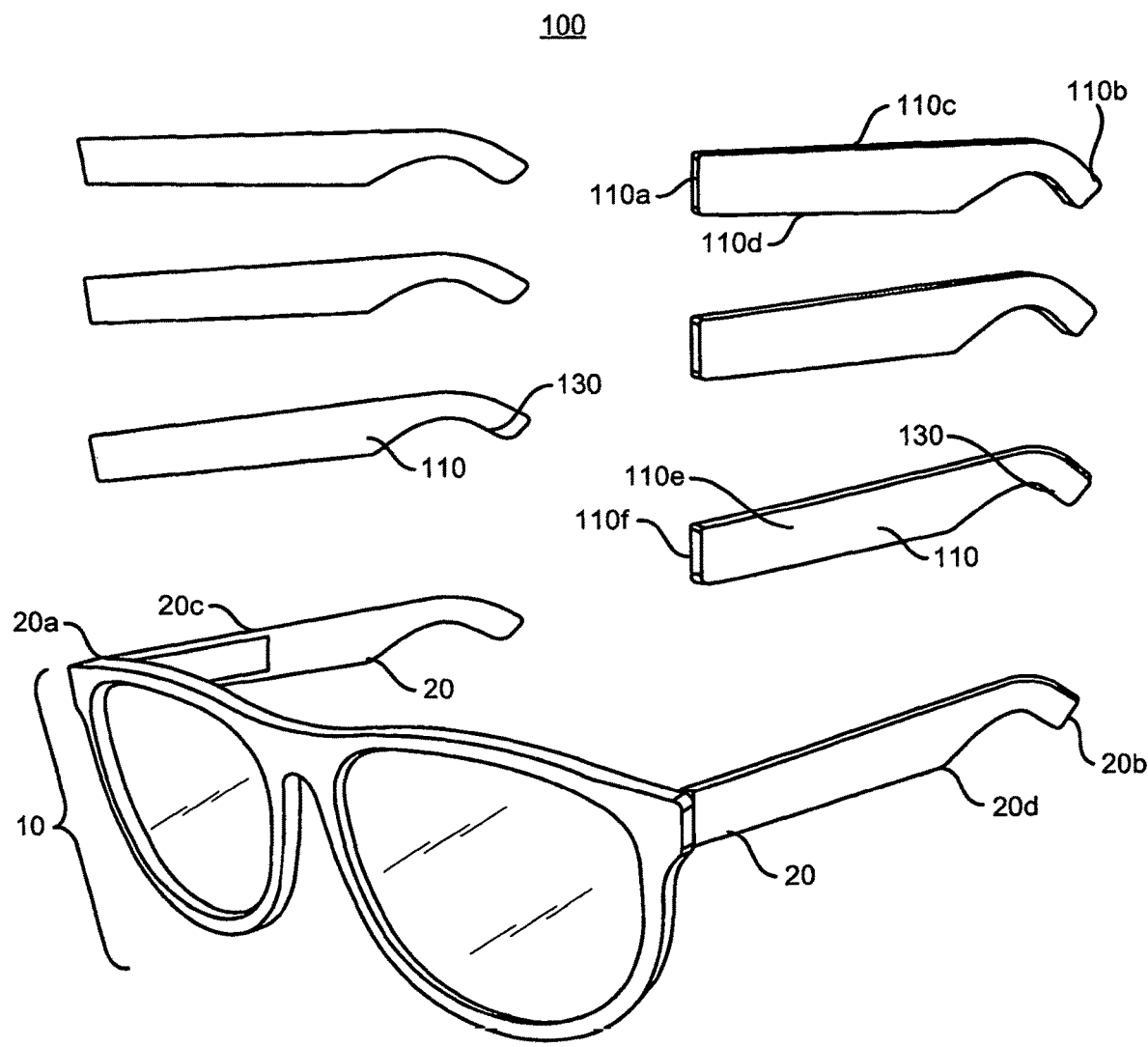
FIG. 1 illustrates a front view of a temple attachment for eyewear, according to an exemplary embodiment of the present general inventive concept.

FIG. 1 illustrates a front view of a temple attachment 100 for eyewear, according to an exemplary embodiment of the present general inventive concept.

Figure 2:
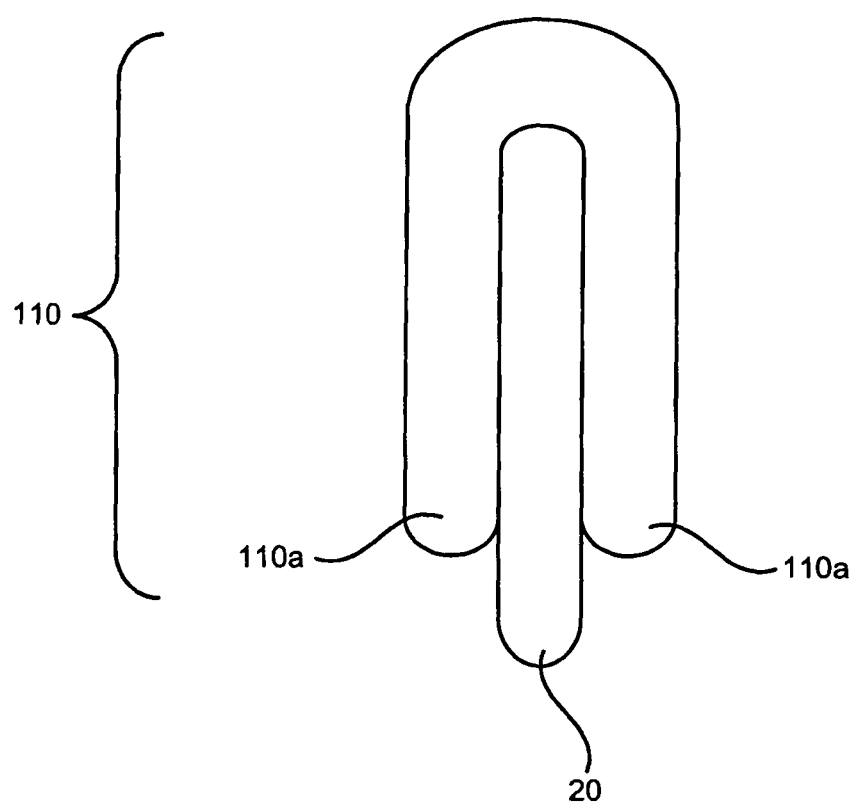
FIG. 2 illustrates a rear view of the temple attachment for eyewear, according to an exemplary embodiment of the present general inventive concept.

FIG. 2 illustrates a rear view of the temple attachment 100 for eyewear, according to an exemplary embodiment of the present general inventive concept.

The temple attachment 100 may include a main body 110, but is not limited thereto. The temple attachment 100 may be constructed from at least one of hard plastic, soft plastic, rubber, silicone, gel, etc., but is not limited thereto. Although, the main body 110 is illustrated in FIG. 1 to be constructed to fit temples of glasses, the main body 110 may be any one of various types of eyewear such as sunglasses, contact lenses, monocles, goggles, etc., but is not limited thereto. The main body 110 may widely vary in design, including shape, color, style, scent, texture, durability, etc., but is not limited thereto.

The main body 110 may include a front edge 110a, a rear edge 110b, a top edge 110c, a bottom edge 110d (collectively, the four edges), a first side 110e, a second side 110f (collectively, the two sides), and a groove 130. The main body 110 may be of a predetermined range of sizes in order to accommodate a pair of glasses 10, which may be of a predetermined range of sizes. The pair of glasses 10 may include the at least one temple 20. The at least one temple 20 may include a front end 20a, a rear end 20b, a top end 20c, and a bottom end 20d (collectively, the four ends). The groove 130 may extend a length of the main body 110, beginning from the top edge 110c near the front edge 110a, and extending through the bottom edge 110d and terminating at the rear edge 110b.

The main body 110 may be affixed and/or adhered to the at least one temple 20 by pressing the main body 110 on to the at least one temple 20. The first edge 110a may be aligned with the front end 20a. The rear edge 110b may be aligned with the rear end 20b. The bottom end 110d may be aligned with the top edge 20c. Specifically, the groove 130 may be directed downward toward the top edge 20c. As such, the main body 110 may be snapped on to the at least one temple 20, by application of a downward force on the main body 110 toward the at least one temple 20.

Alternatively, the main body 110 may be affixed and/or adhered to the at least one temple 20 by pressing or sliding the main body 110 on to the at least one temple 20. The first edge 110a may be placed near the rear end 20b. Specifically, the groove 130 near the front edge 110a, may be directed toward the rear end 20b. As such, the main body 110 may be slid on to the at least one temple 20, by application of a lateral force on the main body 110 toward the at least one temple 20.

Alternatively, the main body 110 may be affixed and/or adhered to the at least one temple 20 by wrapping the main body 110 similar to cellophane. The first edge 110a may be aligned with the front end 20a. The rear edge 110b may be aligned with the rear end 20b. The bottom end 110d may be aligned with the top edge 20c. Specifically, the groove 130 may be directed downward toward the top edge 20c. As such, the main body 110 may be wrapped on to the at least one temple 20 and molded to fit the at least one temple 20, by application of a downward force on the main body 110 toward the at least one temple 20.

Figure 3:
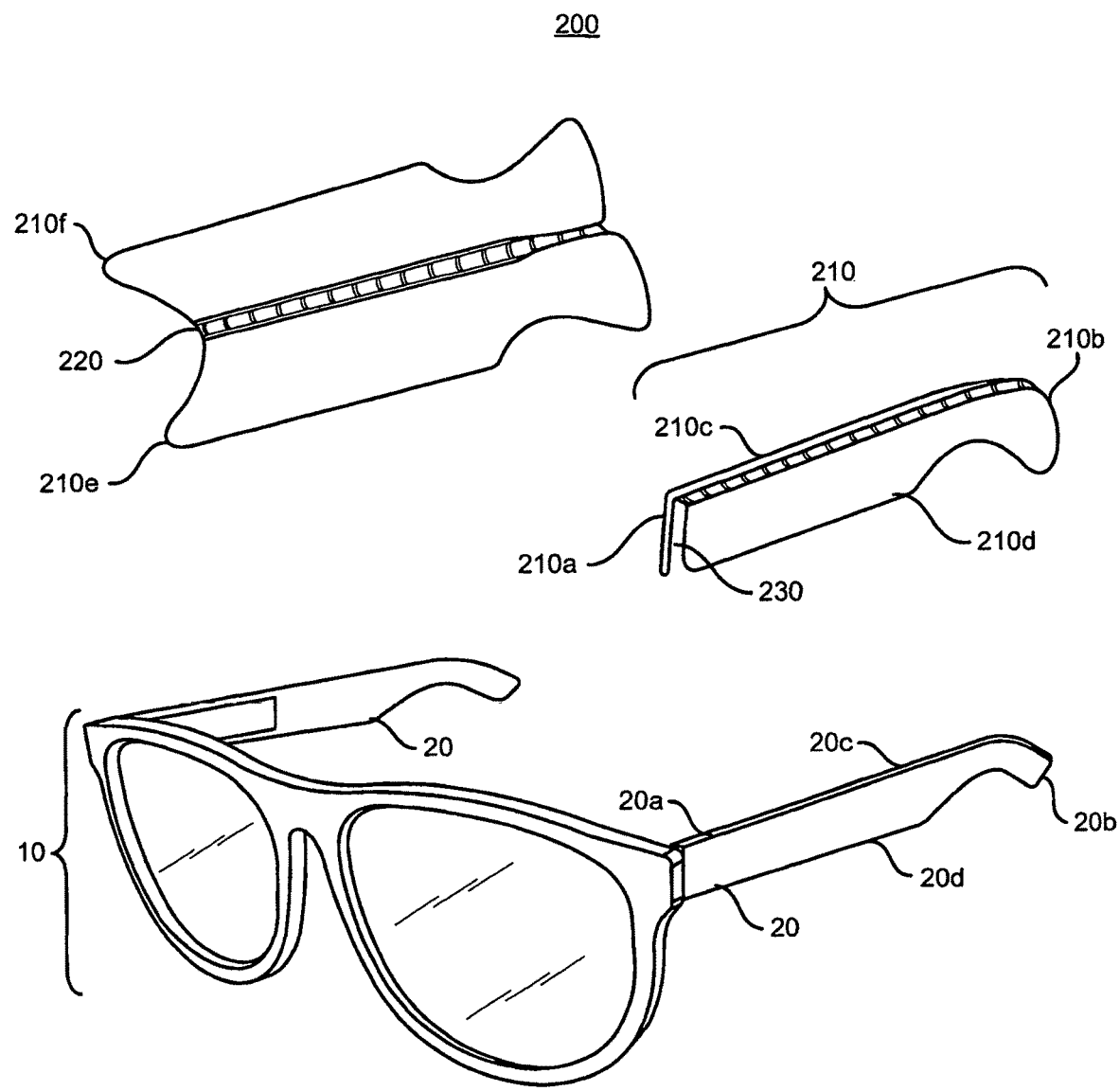
FIG. 3 illustrates a front view of a temple attachment for eyewear, according to another exemplary embodiment of the present general inventive concept.

FIG. 3 illustrates a front view of a temple attachment 200 for eyewear, according to another exemplary embodiment of the present general inventive concept.

The temple attachment 200 may include a main body 210, but is not limited thereto. The temple attachment 200 may be constructed from at least one of hard plastic, soft plastic, rubber, silicone, gel, etc., but is not limited thereto. Although, the main body 210 is illustrated in FIG. 3 to be constructed to fit temples of glasses, the main body 210 may be any one of various types of eyewear such as sunglasses, contact lenses, monocles, goggles, etc., but is not limited thereto. The main body 210 may widely vary in design, including shape, color, style, scent, texture, durability, etc., but is not limited thereto.

The main body 210 may include a front edge 210a, a rear edge 210b, a top edge 210c, a bottom edge 210d (collectively, the four edges), a first side 210e, a second side 210f (collectively, the two sides), a hinge 220, and a groove 230. The main body 210 may be joined on the top edge 210c by the hinge 220. Specifically, the first side 210e and the second side 210f may be connected via the hinge 220. The hinge 220 may extend a length of the main body 210. The main body 210 may be of a predetermined range of sizes in order to accommodate a pair of glasses 10, which may be of a predetermined range of sizes. The pair of glasses 10 may include the at least one temple 20. The at least one temple 20 may include a front end 20a, a rear end 20b, a top end 20c, and a bottom end 20d (collectively, the four ends). The groove 230 may extend the length of the main body 210, beginning from the top edge 210c near the front edge 210a, and extending through the bottom edge 210d and terminating at the rear edge 210b.

The main body 210 may be affixed and/or adhered to the at least one temple 20 by pressing the main body 210 on to the at least one temple 20. The first edge 210a may be aligned with the front end 20a. The rear edge 210b may be aligned with the rear end 20b. The bottom end 110d may be aligned with the top edge 20c. Specifically, the groove 230 may be directed downward toward the top edge 20c. As such, the main body 210 may be snapped on to the at least one temple 20, by application of a downward force on the main body 210 toward the at least one temple 20.

Alternatively, the main body 210 may be affixed and/or adhered to the at least one temple 20 by pressing or sliding the main body 210 on to the at least one temple 20. The first edge 210a may be placed near the rear end 20b. Specifically, the groove 230 near the front edge 210a, may be directed toward the rear end 20b. As such, the main body 210 may be slid on to the at least one temple 20, by application of a lateral force on the main body 210 toward the at least one temple 20.

Alternatively, the main body 210 may be affixed and/or adhered to the at least one temple 20 by pulling the first side 210e and the second side 210f, at the groove 230, in opposite directions, perpendicular to the length of the main body 210. Specifically, the first side 210e and the second side 210f may pivot along the hinge 220, such that the main body 210 will now be considered in an open position. In the open position, the groove 230 may be directed downward toward the top edge 20c. As such, the main body 210 may be closed on the at least one temple 20, by pressing the first side 210e and the second side 210f towards each other, such that the at least one temple 20 is encased by the main body 210.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A temple attachment for a pair of glasses, comprising:
a main body of a predetermined size to fit at least one temple on the pair of glasses, such that the main body varies in at least one of shape, color, style, scent, texture, and durability;

a groove extending across a length of the main body to receive at least a portion of the at least one temple therein to affix the main body on the at least one temple;
a hinge to extend across the length of the main body;
a first side of the main body connected to the hinge; and
a second side of the main body connected to the hinge to pivot along the hinge to open or close.

2. The temple attachment of claim 1, wherein the main body snaps onto the at least one temple via the groove.

3. The temple attachment of claim 1, wherein the main body slides onto the at least one temple via the groove.

4. The temple attachment of claim 1, wherein the main body wraps around the at least one temple and is molded to fit the at least one temple via the groove.

5. The temple attachment of claim 1, wherein the first side and the second side encase the at least one temple.

* * * * *